United States Patent
Sinka et al.

(10) Patent No.: US 10,899,174 B2
(45) Date of Patent: Jan. 26, 2021

(54) WHEEL END ASSEMBLY HAVING A COMPRESSION RING AND METHOD OF ASSEMBLY

(71) Applicant: ArvinMeritor Technology, LLC, Troy, MI (US)

(72) Inventors: Aaron Sinka, Rochester Hills, MI (US); Mark Godwin, Troy, MI (US); Kou Yang, Warren, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 296 days.

(21) Appl. No.: 15/922,308

(22) Filed: Mar. 15, 2018

(65) Prior Publication Data

US 2019/0283497 A1 Sep. 19, 2019

(51) Int. Cl.
*B60B 27/00* (2006.01)
*F16J 15/3276* (2016.01)
*B62D 7/18* (2006.01)

(52) U.S. Cl.
CPC ........ *B60B 27/0073* (2013.01); *B60B 27/001* (2013.01); *F16J 15/3276* (2013.01); *B60B 2900/511* (2013.01); *B62D 7/18* (2013.01); *F16C 2326/02* (2013.01)

(58) Field of Classification Search
CPC ............... F16C 19/525; F16C 2326/02; B60B 27/0073; B60B 27/0089; B60B 2900/511; F16J 15/16; F16J 15/3248; F16J 15/2352; F16J 15/3256; F16J 15/3264; F16J 15/3268; F16J 15/3276; B62D 7/18
See application file for complete search history.

(56) References Cited

U.S. PATENT DOCUMENTS

| 3,027,975 | A | | 4/1962 | Erickson |
| 3,635,303 | A | | 1/1972 | Hetmann et al. |
| 3,782,841 | A | | 1/1974 | Winckelhaus |
| 4,161,120 | A | | 7/1979 | Cloarec |
| 4,705,090 | A | | 11/1987 | Bartos |
| 4,730,656 | A | | 3/1988 | Goodell et al. |
| 4,733,707 | A | | 3/1988 | Goodell et al. |
| 4,809,833 | A | * | 3/1989 | Brunken ................. F16C 19/52 192/110 B |
| 4,946,296 | A | | 8/1990 | Oischewski |
| 5,031,967 | A | | 7/1991 | Svensson |

(Continued)

FOREIGN PATENT DOCUMENTS

| CA | 2052238 C | 9/1994 |
| CN | 103477103 A | 12/2013 |

(Continued)

OTHER PUBLICATIONS

India Examination Report for IN Application No. 201814016385, dated Jan. 21, 2020, 6 pages.

(Continued)

*Primary Examiner* — Alan B Waits
(74) *Attorney, Agent, or Firm* — Brooks Kushman PC (57) ABSTRACT

A wheel end assembly having a steering knuckle, a hub, and a compression ring. The steering knuckle may have an opening that may extend around a spindle. The hub may be rotatably disposed on the spindle. The compression ring may be disposed on the hub and may be at least partially disposed in the opening.

22 Claims, 7 Drawing Sheets

(56) References Cited

U.S. PATENT DOCUMENTS

| | | | |
|---|---|---|---|
| 5,095,770 A | | 3/1992 | Rader, III |
| 5,131,763 A | | 7/1992 | Caron |
| 5,174,839 A | | 12/1992 | Schultz et al. |
| 5,292,199 A | * | 3/1994 | Hosbach .............. F16J 15/3256 |
| | | | 384/478 |
| 5,354,391 A | | 10/1994 | Goodell et al. |
| 5,476,272 A | | 12/1995 | Hixson |
| 5,695,289 A | * | 12/1997 | Ouchi ................... F16C 19/185 |
| | | | 324/174 |
| 5,893,648 A | | 4/1999 | Smith |
| 6,145,558 A | | 11/2000 | Schmitz |
| 6,186,667 B1 | | 2/2001 | Nakamura |
| 6,196,639 B1 | | 3/2001 | DiPonio et al. |
| 6,217,220 B1 | | 4/2001 | Ohkuma et al. |
| 6,363,985 B1 | | 4/2002 | Beesley |
| 6,457,869 B1 | | 10/2002 | Smith |
| 6,634,648 B1 | | 10/2003 | Rockwell |
| 6,719,028 B2 | | 4/2004 | D'Amico et al. |
| 6,994,136 B2 | | 2/2006 | Stanczak |
| 7,455,459 B2 | | 11/2008 | Toth |
| 7,690,412 B1 | | 4/2010 | Jenkinson et al. |
| 7,931,061 B2 | | 4/2011 | Gonska et al. |
| 8,020,676 B2 | | 9/2011 | Bradley |
| 8,475,052 B2 | | 7/2013 | Ostrander et al. |
| 8,616,254 B2 | | 12/2013 | Kelley et al. |
| 8,777,241 B1 | * | 7/2014 | Hamernik ................ B62D 7/18 |
| | | | 280/93.512 |
| 8,915,274 B2 | | 12/2014 | Eschenburg et al. |
| 9,221,395 B2 | | 12/2015 | Honig et al. |
| 9,261,144 B2 | | 2/2016 | Duch |
| 9,481,213 B2 | | 11/2016 | Keeney et al. |
| 9,539,865 B2 | | 1/2017 | Lakin et al. |
| 2007/0211974 A1 | | 9/2007 | Toth |
| 2009/0245935 A1 | | 10/2009 | Kamikawa et al. |
| 2010/0225157 A1 | | 9/2010 | Kirby |
| 2010/0285890 A1 | | 11/2010 | Dougherty et al. |
| 2011/0133046 A1 | | 6/2011 | Lemerise et al. |
| 2012/0186714 A1 | | 7/2012 | Richardson |
| 2012/0187747 A1 | * | 7/2012 | Dagh ................. F16C 33/6681 |
| | | | 301/6.5 |
| 2012/0234447 A1 | | 9/2012 | Narloch et al. |
| 2013/0146380 A1 | * | 6/2013 | Webster .............. B60B 27/0005 |
| | | | 180/253 |
| 2014/0239597 A1 | | 8/2014 | White |
| 2015/0101722 A1 | | 4/2015 | Lakin et al. |
| 2015/0107742 A1 | | 4/2015 | Knapke |
| 2015/0137585 A1 | * | 5/2015 | Ono ........................ F16D 65/10 |
| | | | 301/109 |
| 2016/0053840 A1 | | 2/2016 | Hayford et al. |
| 2016/0059626 A1 | | 3/2016 | Gemello |
| 2016/0159145 A1 | | 6/2016 | Nagata et al. |
| 2016/0318359 A1 | | 11/2016 | Knapke et al. |
| 2017/0036693 A1 | | 2/2017 | Reid |
| 2018/0126782 A1 | | 5/2018 | Sinka et al. |

FOREIGN PATENT DOCUMENTS

| | | |
|---|---|---|
| DE | 102007010290 A1 | 9/2008 |
| DE | 102014106519 A1 | 11/2015 |
| EP | 0822413 A2 | 7/1997 |
| EP | 2980432 A1 | 3/2014 |
| FR | 3001509 A1 | 8/2014 |
| JP | 2004169925 | 6/2004 |
| JP | 2008221864 A | 9/2008 |
| JP | 2012219971 A | 11/2012 |
| JP | 2014013073 A | 1/2014 |
| JP | 5790110 B2 | 7/2015 |
| JP | 2015142404 A | 8/2015 |
| JP | 2017007528 A | 1/2017 |
| WO | 2013047695 A1 | 4/2013 |

OTHER PUBLICATIONS

Extended European Search Report for European Application No. 18170051.9 dated Sep. 12, 2018, 10 pages.

Examination Report for AU Application No. 2018203025, dated Sep. 14, 2018, 6 pages.

U.S. Appl. No. 15/585,262, filed May 3, 2017.

Search Report for EP application No. 17195400, Search Report dated Jan. 16, 2018.

U.S. Appl. No. 15/346,792, filed Nov. 9, 2016.

Extended European Search Report for EP Application No. 18170052.7, dated Oct. 10, 2018, 8 pages.

Chinese Office Action dated Apr. 28, 2020, for related Chinese Appln. No. 201810391605.6; 10 Pages.

* cited by examiner

WHEEL END ASSEMBLY HAVING A COMPRESSION RING AND METHOD OF ASSEMBLY

TECHNICAL FIELD

This disclosure relates to a wheel end assembly having a compression ring that may be disposed between a hub and a steering knuckle.

BACKGROUND

A wheel end assembly is disclosed in U.S. patent application Ser. No. 15/346,792, filed Nov. 9, 2016.

SUMMARY

In at least one approach, a wheel end assembly is provided. The wheel end assembly may include a steering knuckle, a hub, a seal assembly, and a compression ring. The steering knuckle may have a spindle and an opening that extends around the spindle. The hub may be rotatable about an axis with respect to the spindle. The seal assembly may be at least partially disposed in the opening and may extend from the spindle to the hub. The seal assembly may have an outer seal case that may be disposed on the hub and an inner seal case that may be disposed on the spindle. The compression ring may be disposed on the hub and that may be at least partially disposed in the opening. The compression ring may exert a radial compressive force on the hub in a direction that extends toward the seal assembly and the axis to inhibit the outer seal case from moving with respect to the hub.

In at least one approach, a method for assembling a wheel end assembly is provided. The method may include heating a compression ring to expand the compression ring. The method may further include positioning the compression ring with respect to a hub such that the hub is received in the compression ring. The method may further include cooling the compression ring so that the compression ring exerts a radially inward force on the hub.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
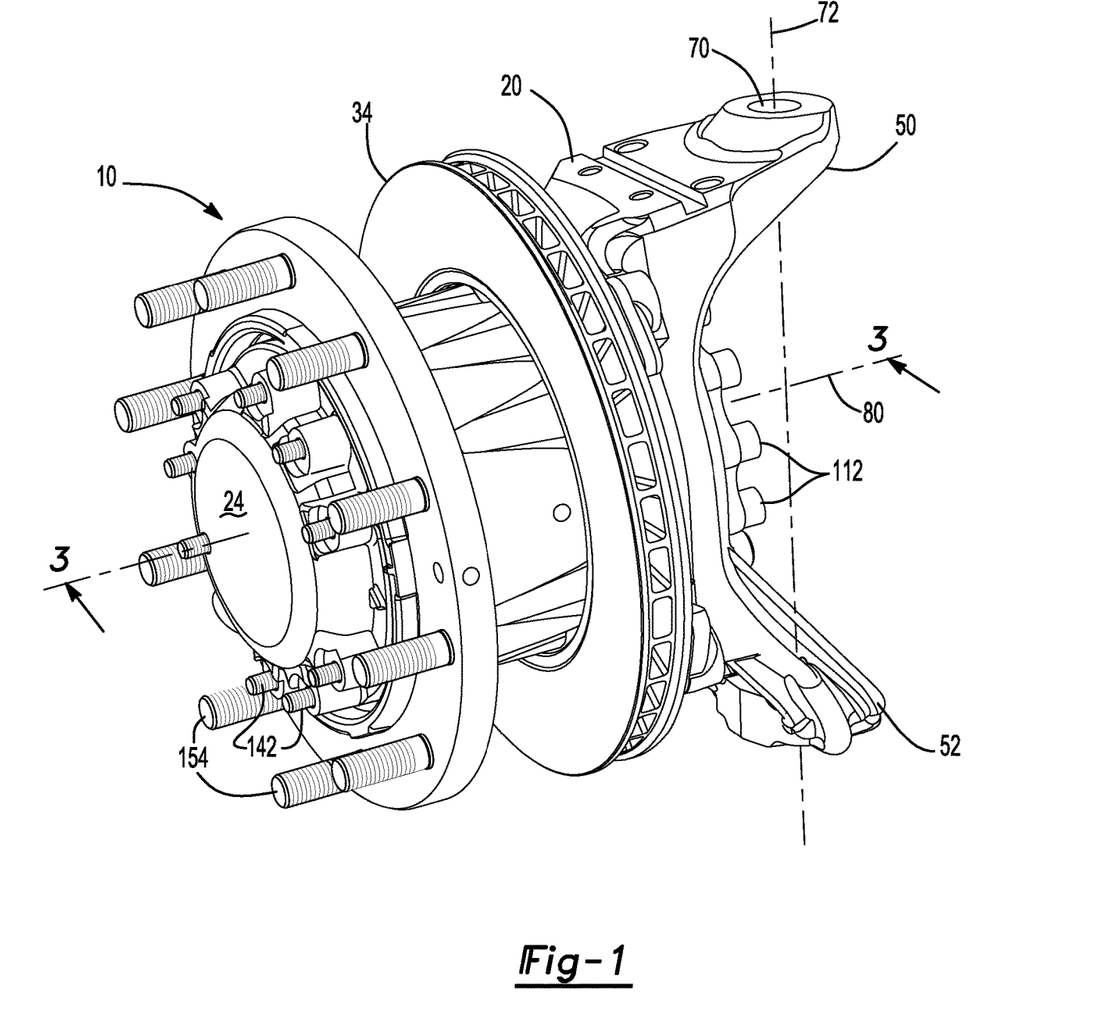
FIG. 1 is a perspective view of a wheel end assembly.

Referring to FIG. 1, an example of a wheel end assembly 10 is shown. The wheel end assembly 10 may be provided with a motor vehicle like a truck, bus, farm equipment, military transport or weaponry vehicle, or cargo loading equipment for land, air, or marine vessels or a trailer that may be provided with a motor vehicle.

The wheel end assembly 10 may be part of a drive axle or a non-drive axle. A drive axle may receive torque from a power source, such as an internal combustion engine or electric motor. In a drive axle configuration, an axle shaft may transmit torque to the wheel end assembly 10 to rotate a wheel that may be mounted on the wheel end assembly 10. For instance, the axle shaft may be operatively connected at a first end to a vehicle drivetrain component, like a differential or input shaft, and may be coupled to the wheel end assembly 10 at a second end. The axle shaft may be omitted in a non-drive axle configuration.

Figure 2:
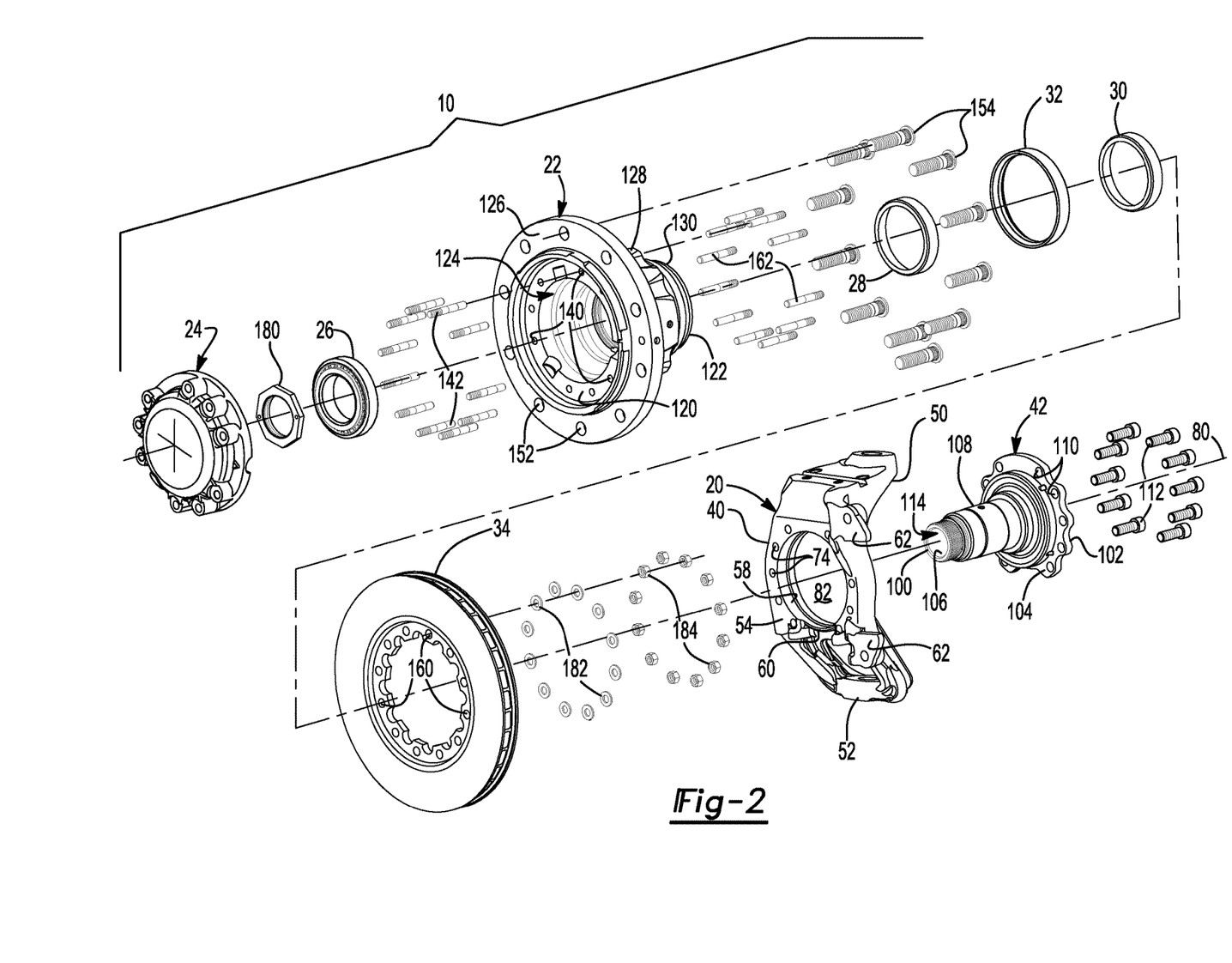
FIG. 2 is an exploded view of the wheel end assembly.

Referring to FIGS. 1 and 2, the wheel end assembly 10 may facilitate mounting and rotation of a vehicle wheel. The wheel end assembly 10 may include a steering knuckle 20, a hub 22, a hub cap 24, a first wheel bearing 26, a second wheel bearing 28, a seal assembly 30, a compression ring 32, and a brake friction member 34.

Figure 3:
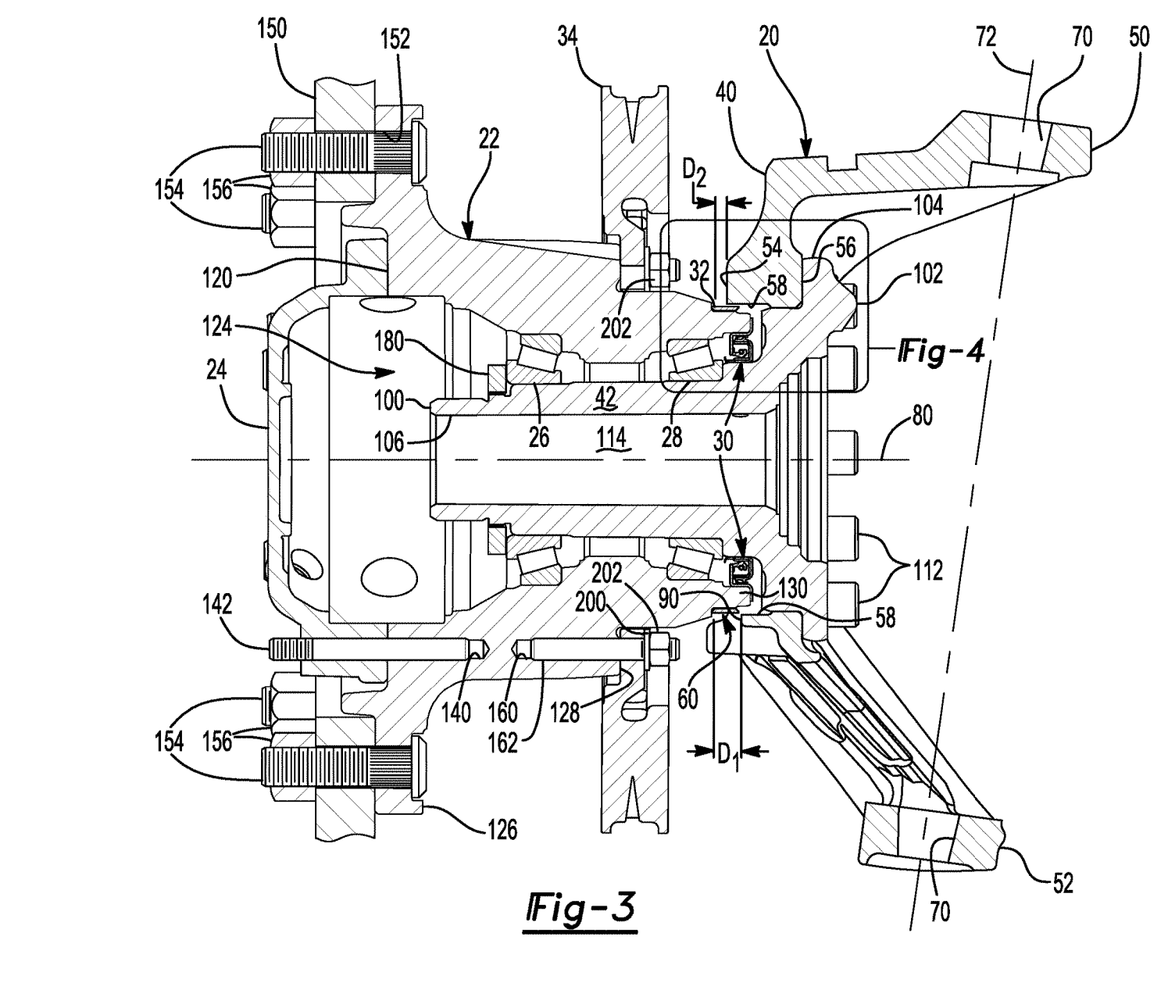
FIG. 3 is a section view of the wheel end assembly along section line 3-3 with the addition of a wheel that is mounted on a hub and showing a compression ring.

Referring to FIGS. 2 and 3, the steering knuckle 20 may be part of a steering system that may be used to steer or change the direction of the vehicle. The steering knuckle 20 may be pivotally disposed on a support member, such as an axle assembly or a vehicle suspension system. In at least one configuration, the steering knuckle 20 may include a steering knuckle body 40 and a spindle 42.

Figures 4, 5:
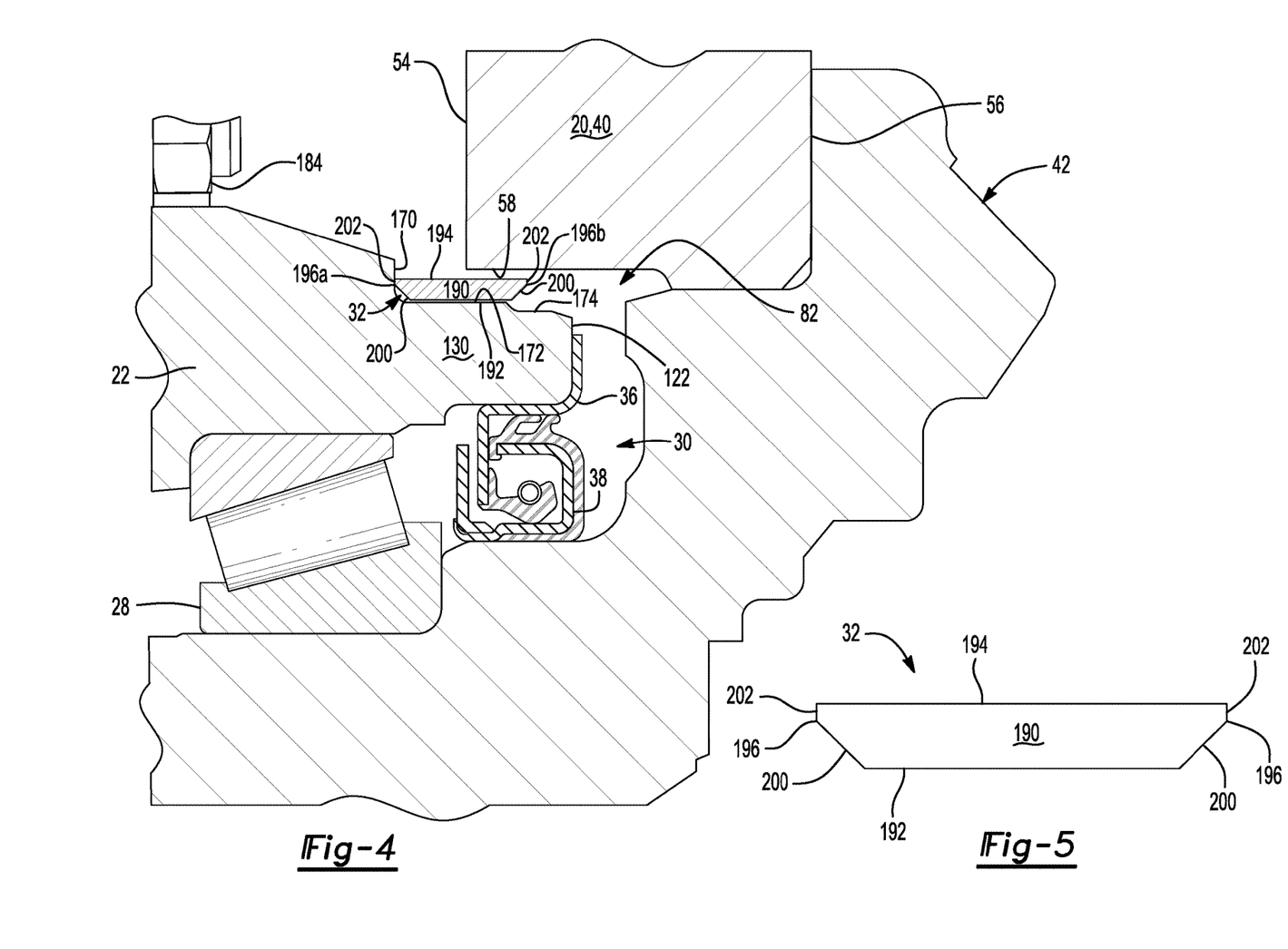
FIG. 4 is a magnified view of a portion of the wheel end assembly shown in FIG. 3.
FIG. 5 is a section view of the compression ring of FIG. 4.

Referring to FIGS. 2, 3 and 5, the steering knuckle body 40 may facilitate mounting of various components to the steering knuckle 20. In at least one configuration, the steering knuckle body 40 may include a first arm 50, a second arm 52, an outboard side 54, an inboard side 56, an inner surface 58, a notch 60, and one or more brake mounts 62.

The first arm 50 may be disposed near the top of the steering knuckle body 40 and may extend away from the outboard side 54. The first arm 50 may include a kingpin hole 70 that may receive a kingpin that may couple the steering knuckle 20 to another vehicle component, such as an axle beam or linkage. As such, the steering knuckle 20 may pivot or rotate about the kingpin and a kingpin axis 72. The kingpin hole 70 may be a through hole that may extend through the first arm 50.

The second arm 52 may be disposed near the bottom of the steering knuckle body 40 and may also extend away from the outboard side 54. The second arm 52 may also include a kingpin hole 70 that may receive the kingpin.

Referring to FIG. 3, the outboard side 54 face toward the hub 22. As is best shown in FIGS. 2 and 5, a set of spindle mounting holes 74 may be provided in the outboard side 54. The spindle mounting holes 74 may be spaced apart from each other and may be radially disposed about an axis 80. Eight spindle mounting holes 74 are shown, but it is contemplated that a greater or lesser number may be provided. Moreover, the spindle mounting holes 74 may be omitted in various configurations, such as when the spindle 42 is integrally formed with the steering knuckle body 40. The spindle mounting holes 74 may extend from the outboard side 54 to the inboard side 56 and may be threaded.

The inboard side 56 may be disposed opposite the outboard side 54. As such, the inboard side 56 may face away from the hub 22. The inboard side 56 may engage the spindle 42 in one or more configurations.

Referring to FIGS. 2 and 3, the inner surface 58 may extend around the axis 80. In addition, the inner surface 58 may at least partially define an opening 82 that may extend through the steering knuckle body 40. For example, the opening 82 may extend from the outboard side 54 toward or to the inboard side 56. The inner surface 58 or portion thereof may be radially disposed with respect to the axis 80.

The notch 60 may be disposed below the axis 80 and may be located near or at the bottom of the inner surface 58 and the opening 82. For example, the notch 60 or portion thereof may be disposed directly below the axis 80 as is best shown in FIGS. 2 and 3. The notch 60 may extend from the outboard side 54 toward the inboard side 56. For instance, the notch 60 may extend in an axial direction or in a direction that extends parallel to the axis 80 from the outboard side 54 to a notch end surface 90 as is best shown in FIGS. 3 and 5. The notch end surface 90 may face toward the hub 22 and be axially positioned between the outboard side 54 in the inboard side 56. In addition, the notch end surface 90 may be disposed substantially perpendicular to the axis 80 in one or more configurations.

Figure 6:
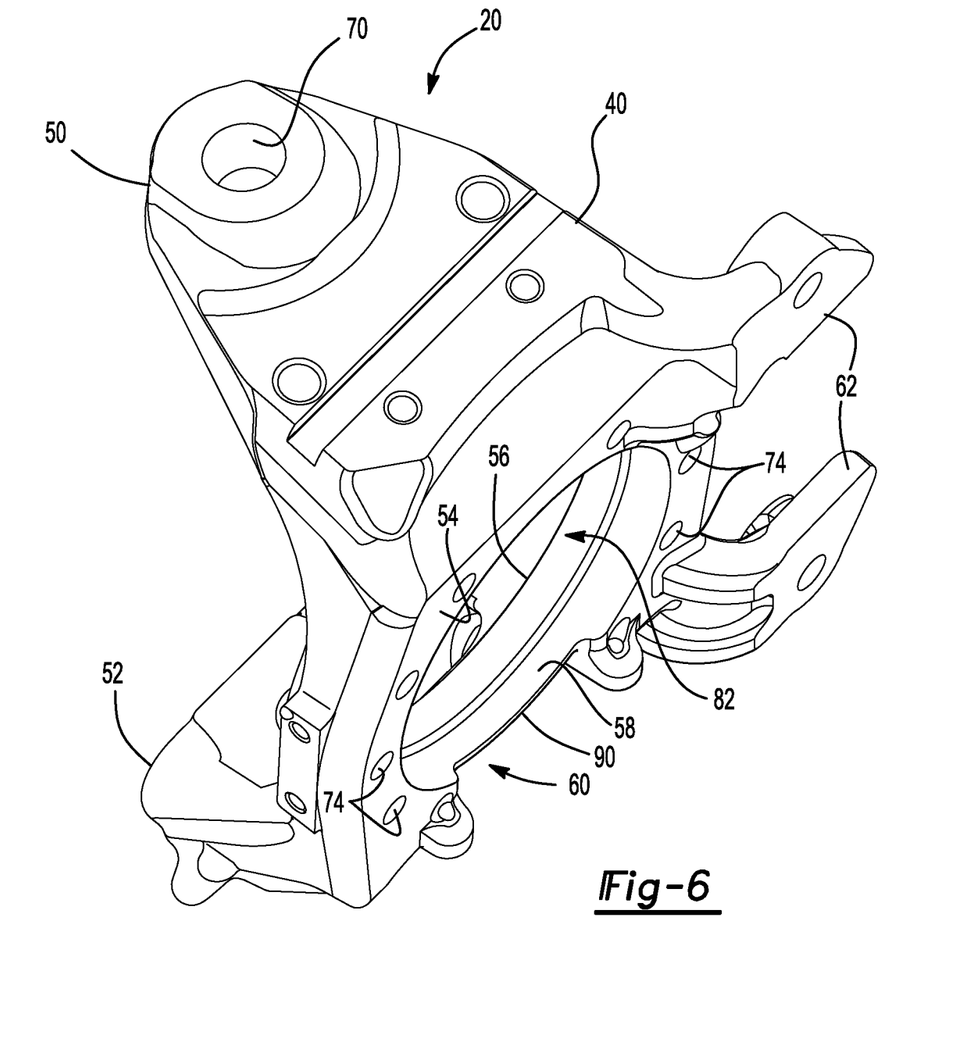
FIG. 6 is a perspective view of an example of a steering knuckle that may be provided with the wheel end assembly.

Referring to FIGS. 2 and 6, one or more brake mounts 62 may be provided to facilitate mounting of a brake assembly to the steering knuckle 20. For example, the brake mounts 62 may facilitate mounting of a brake caliper to the steering knuckle 20. The brake mounts 62 may extend from the outboard side 54 and may be spaced apart from the opening 82. In FIGS. 2 and 6, the brake mounts 62 are integrally formed with the steering knuckle body 40; however, it is contemplated that the brake mounts 62 may be provided as separate components that may be fastened to the steering knuckle body 40.

Referring to FIGS. 2 and 3, the spindle 42 may rotatably support the hub 22. For example, the spindle 42 may support the first wheel bearing 26 and the second wheel bearing 28, which in turn may support and facilitate rotation of the hub 22 and an associated vehicle wheel. In addition, the spindle 42 may extend along or may be centered about the axis 80.

The spindle 42 may be received in the opening 82. As such, the opening 82 may extend around a portion of the spindle 42. In addition, the spindle 42 may be fixedly positioned with respect to the steering knuckle body 40. Accordingly, the spindle 42 may not rotate about the axis 80 or rotate with respect to the steering knuckle body 40. For instance, the spindle 42 may be integrally formed with the steering knuckle body 40 or may be a separate component that may be fixedly mounted to the steering knuckle body 40. In the configuration shown, the spindle 42 is separate from the steering knuckle body 40 and may include a first spindle end surface 100, a second spindle end surface 102, a spindle mounting flange 104, an internal surface 106, and an external surface 108.

The first spindle end surface 100 may be disposed at a free end or distal end of the spindle 42. The first spindle end surface 100 may be disposed inside the hub 22 and may face toward the hub cap 24.

The second spindle end surface 102 may be disposed opposite the first spindle end surface 100. The second spindle end surface 102 may be disposed proximate or adjacent to the steering knuckle body 40 in configurations where the spindle 42 is a separate component from the steering knuckle body 40. For instance, the second spindle end surface 102 may be disposed near the inboard side 56 of the steering knuckle body 40. The second spindle end surface 102 may be omitted in configurations where the spindle 42 is integrally formed with the steering knuckle 20.

The spindle mounting flange 104 may extend in an axial direction from the second spindle end surface 102 toward the first spindle end surface 100. In addition, the spindle mounting flange 104 may extend outwardly away or radially away from the axis 80 and may facilitate mounting of the spindle 42 to the steering knuckle body 40. For example, the spindle mounting flange 104 may include a plurality of mounting flange holes 110 that may extend through the spindle mounting flange 104 as is best shown in FIG. 2. The mounting flange holes 110 may be arranged around the axis 80 and may be aligned with corresponding spindle mounting holes 74. Each mounting flange hole 110 may receive a spindle mounting fastener 112, such as a bolt, that may couple the spindle 42 to the steering knuckle body 40. Each spindle mounting fastener 112 may be received in a corresponding spindle mounting hole 74 of the steering knuckle body 40.

Referring to FIGS. 2 and 3, the internal surface 106 may extend between the first spindle end surface 100 and the second spindle end surface 102. As is best shown in FIG. 3, the internal surface 106 may at least partially define a spindle hole 114. The axle shaft, if provided, may extend through the spindle hole 114. The internal surface 106 and the spindle hole 114 may optionally be omitted in a non-drive axle configuration.

The external surface 108 may be disposed opposite the internal surface 106. The external surface 108 may support the first wheel bearing 26 and the second wheel bearing 28 as will be discussed in more detail below.

Referring to FIGS. 2 and 3, the hub 22 may be rotatably disposed on the spindle 42. As such, the hub 22 may be rotatable about the axis 80 with respect to the spindle 42. In a drive axle configuration, the hub 22 may be operatively connected to an axle shaft. In at least one configuration, the hub 22 may have a first end surface 120, a second end surface 122, a hub cavity 124, a first hub mounting flange 126, a second hub mounting flange 128, and a mounting ring 130.

The first end surface 120 may face toward and may engage the hub cap 24. As is best shown in FIG. 2, the first end surface 120 may include a plurality of hub cap fastener holes 140. The hub cap fastener holes 140 may be arranged around the axis 80 and may receive a fastener 142, such as a mounting stud or a bolt, that may couple the hub cap 24 to the hub 22.

Referring to FIGS. 2 and 4, the second end surface 122 may be disposed opposite the first end surface 120. The second end surface 122 may face away from the hub cap 24 and may face toward the steering knuckle 20. As is best shown in FIG. 4, the second end surface 122 may be received in the opening 82 of the steering knuckle body 40.

Referring to FIGS. 2 and 3, the hub cavity 124 may extend from the first end surface 120 to the second end surface 122. The hub cavity 124 may receive at least a portion of various components of the wheel end assembly 10, such as the spindle 42, first wheel bearing 26, and the second wheel bearing 28.

The first hub mounting flange 126 may be disposed near the first end surface 120. The first hub mounting flange 126 may extend away from the axis 80. For instance, the first hub mounting flange 126 may extend substantially perpendicular to the axis 80 in one or more configurations. The first hub mounting flange 126 may facilitate mounting of a wheel 150 that may support a tire. For example, the first hub mounting flange 126 may include a set of mounting lug fastener holes 152 that may each receive a wheel mounting lug 154. As is best shown in FIG. 3, the wheel 150 may have a wheel mounting flange that may have a set of holes that may be aligned with the wheel mounting lugs 154. A lug nut 156 may be threaded onto each wheel mounting lug 154 to secure the wheel 150 to the hub 22.

Referring to FIGS. 2 and 3, the second hub mounting flange 128 may be located near the center of the hub 22. For instance, the second hub mounting flange 128 may be axially positioned between the first end surface 120 and the second end surface 122. The second hub mounting flange 128 may facilitate mounting of the brake friction member 34 of a brake subsystem. For example, the second hub mounting flange 128 may include a set of fastener holes 160 as is best shown in FIG. 3. A fastener hole 160 may receive a brake friction member fastener 162, such as a mounting stud or bolt, that may facilitate mounting of the brake friction member 34 to the hub 22 such that the brake friction member 34 rotates with the hub 22.

Referring to FIGS. 2 and 4, the mounting ring 130 may be disposed at an end of the hub 22. For example, the mounting ring 130 may extend in an axial direction from the second end surface 122 toward the hub cap 24. Moreover, the second end surface 122 may define and may be referred to as an end surface of the mounting ring 130. The mounting ring 130 may extend around the axis 80 and may extend into the opening 82 of the steering knuckle body 40. In at least one configuration, the mounting ring 130 may have a step surface 170, a first outer surface 172, and a second outer surface 174.

Referring to FIG. 4, the step surface 170 may be disposed outside of the opening 82 and may face away from the hub cap 24 and toward the steering knuckle 20. The step surface 170 may be disposed substantially perpendicular to the axis 80. In addition, the step surface 170 may be axially positioned between the second end surface 122 and the second hub mounting flange 128 as is best shown with reference to FIGS. 3 and 4. The step surface 170 may facilitate positioning of the compression ring 32 as will be discussed in more detail below.

The first outer surface 172 may extend from the step surface 170 to or toward the second end surface 122. The first outer surface 172 may extend continuously around the axis 80 and may be disposed at a substantially constant radial distance from the axis 80. The compression ring 32 may be disposed on the first outer surface 172 as will be discussed in more detail below.

The second outer surface 174 may extend from the second end surface 122 to or toward the first outer surface 172. As is best shown in FIG. 4, the second outer surface 174 may be disposed opposite the seal assembly 30. The second outer surface 174 may extend continuously around the axis 80 and may be disposed a substantially constant radial distance from the axis 80. The second outer surface 174 may be disposed closer to the axis 80 than the first outer surface 172. The compression ring 32 may be spaced apart from and may not engage the second outer surface 174. It is also contemplated that the second outer surface 174 may be omitted, such as when the first outer surface 172 extends to the second end surface 122.

Referring to FIGS. 2 and 3, the first wheel bearing 26 may be disposed on the spindle 42 and may rotatably support the hub 22. For example, the first wheel bearing 26 may be disposed on and may extend around the external surface 108 of the spindle 42 and may be received in the hub cavity 124. The first wheel bearing 26 may be positioned closer to the first spindle end surface 100 than the second wheel bearing 28.

The first wheel bearing 26 may have any suitable configuration. For instance, the first wheel bearing 26 may include a plurality of rolling elements, such as balls or rollers, that may be disposed between an inner race and an outer race. The inner race may be disposed on and may extend around the external surface 108 of the spindle 42. The outer race may be disposed on the hub 22 and may extend around the inner race.

The retaining nut 180 may help secure the first wheel bearing 26. More specifically, the retaining nut 180 may inhibit or limit axial movement of the first wheel bearing 26 along the spindle 42 in a direction that extends toward the first spindle end surface 100. For example, the retaining nut 180 may receive and may mate with corresponding threads on the spindle 42. The retaining nut 180 may engage the inner race of the first wheel bearing 26 and may be tightened to exert a preload force on the first wheel bearing 26.

The second wheel bearing 28 may also be disposed on the spindle 42 and may rotatably support the hub 22. For example, the second wheel bearing 28 may be disposed on and may extend around the external surface 108 of the spindle 42 and may be received in the hub cavity 124. The second wheel bearing 28 may be positioned closer to the second spindle end surface 102 than the first wheel bearing 26. The second wheel bearing 28 may have any suitable configuration. For instance, the second wheel bearing 28 may include a plurality of rolling elements, such as balls or rollers, that may be disposed between an inner race and an outer race.

Referring to FIG. 1, the brake friction member 34 may be part of a brake subsystem that may brake an associated wheel. The brake subsystem may have any suitable configuration. For instance, the brake subsystem may be configured as a friction brake, such as a disc brake or a drum brake. In FIG. 1, a portion of the brake subsystem is shown that has a disc brake configuration. In such a configuration, the brake friction member 34 may be a brake rotor. The brake friction member 34 may be configured as a brake drum when the brake subsystem is configured as a drum brake. One or more brake pads may be actuated into engagement with the brake friction member 34 to slow rotation of the hub 22 and the wheel 150 about the axis 80.

Referring to FIGS. 2 and 3, the brake friction member 34 may be fixedly disposed on the hub 22 by way of the brake friction member fasteners 162. In at least one configuration, a washer 182 and a nut 184 may be disposed on the brake friction member fasteners 162 to secure the brake friction member 34. As is best shown in FIG. 3, the brake friction member 34 may be axially positioned such that the brake friction member 34 extends around the hub 22 and may generally be positioned between the first wheel bearing 26 and the second wheel bearing 28.

Referring to FIGS. 2-4, the seal assembly 30 may be disposed between the hub 22 and the spindle 42. For example, the seal assembly 30 may extend continuously around the axis 80 and the spindle 42 and may extend from the spindle 42 to the hub 22. In addition, the seal assembly 30 may be axially positioned between the second wheel bearing 28 and the spindle 42. The seal assembly 30 may be completely or partially disposed inside the opening 82 of the steering knuckle body 40 and inside the hub cavity 124. The seal assembly 30 may help inhibit lubricant from exiting the hub cavity 124 between the spindle 42 and the hub 22. In addition, the seal assembly 30 may inhibit contaminants from entering the hub cavity 124.

In at least one approach, the seal assembly 30 may include at least one seal case 36 and a seal 38. More particularly, the seal assembly 30 may include an inner seal case 36*a* and an outer seal case 36*b*. The seal case 36 may position and hold the seal 38. The mounting bracket 25 may be fixedly disposed on the hub 22. As such, the seal case 36 may rotate with the hub 22 and with respect to the seal 38. The seal case 36 may be secured to the hub 22 in any suitable manner, such as through an interference fit engagement.

In at least one approach, the seal case 36 may be formed of a first material, and the hub 22 may be formed of a second material different than the first material. For example, the hub 22 may be formed of aluminum, and the seal case 36 may be formed of steel. As such, the seal case 36 and the hub 22 may have different coefficients of thermal expansion. More particularly, the hub 22 may have a thermal expansion coefficient greater than that of the seal case 36. For example, the seal case 36 may have a volumetric thermal expansion coefficient ($\alpha_V$) in the range of approximately $33\times10^{-6}K^{-1}$ to approximately $39\times10^{-6}K^{-1}$ at 20° C. The hub 22 may have a volumetric thermal expansion coefficient ($\alpha_V$) in the range of approximately $68\times10^{-6}K^{-1}$ to approximately $70\times10^{-6}K^{-1}$ at 20° C. As such, the hub 22 may expand at a greater rate when exposed to elevated temperatures (e.g., 150° C. or greater) at the wheel end assembly 10. The expansion of the hub 22 relative to the seal case 36 may deteriorate or diminish the fit between hub 22 and the seal case 36. A loose or otherwise ineffective fit between hub 22 and the seal case 36 may cause the hub 22 to rotate relative to the seal case 36, which may weaken or even destroy the structural integrity of the hub 22, the seal case 36, or both the hub 22 and the seal case 36.

To reduce or inhibit the degree of expansion of the hub 22, the hub 22 may be provided with a compression ring 32. The compression ring 32 may be disposed on the hub 22, for example, about the at the mounting ring 130, and may be at least partially disposed in the opening 82. For example, the compression ring 32 may be fixedly positioned with respect to the hub 22 such that the compression ring 32 and the hub 22 may rotate together about the axis 80 with respect to the steering knuckle 20. The compression ring 32 may be configured as a ring that may extend continuously around the hub 22 and the axis 80.

The compression ring 32 may be disposed on the hub 22 such that the compression ring 32 exerts a compressive force on the mounting ring 130; for example, a compressive force in the radial direction toward the axis 80. The compressive force may act on the entire outer circumference of the mounting ring 130 to urge the mounting ring 130 toward the axis 80.

As is best shown in FIGS. 4 and 5, the compression ring 32 may have a generally trapezoidal cross-section and may include a body 190 that may define (and may extend between) an inner surface 192 defining opposing ends, an outer surface 194 defining opposing ends, and opposing side surfaces 196 extending between the inner surface 192 and the outer surface 194.

The inner surface 192 may define an inner diameter of the compression ring 32. The inner diameter may be in the range, for example, of approximately 159 millimeters to approximately 160 millimeters. The inner surface 192 may be disposed on the mounting ring 130 of the hub 22. In addition, inner surface 192 may extend continuously around the mounting ring 130 and the axis 80. The inner surface 192 may be disposed on the first outer surface 172 and may be radially disposed with respect to the axis 80. The inner surface 192 may be spaced apart from and may not engage the second outer surface 174.

The outer surface 194 may define an outermost diameter of the compression ring 32. The outer diameter may be in the range, for example, of approximately 165 millimeters to approximately 166 millimeters. In at least one approach, the outer surface 194 may have a substantially planar cross section in a plane in which the axis is completely disposed. The outer surface 194 may have an axial length along the cross section greater than an axial length of the inner surface 192. For example, outer surface 194 may have an axial length along the cross section of approximately 17 millimeters, and the inner surface 192 may have an axial length of approximately 16 millimeters or less. The outer surface 194 may be parallel to the inner surface 192. The outer surface 194 may have a surface area (e.g., at a surface facing inner surface 58) greater than a surface area of the inner surface 192 (e.g., at a surface facing the first outer surface 172).

The opposing side surfaces 196 may extend at equal lengths between the inner surface 192 and the outer surface 194. In at least one approach, one side surface 196*b* may be received within the opening 82 of the steering knuckle body 40, and an opposing side surface 196*a* may not be received in the opening 82. In at least one approach, one side surface 196*a* may engage the hub 22. For example, one side surface 196*a* may extend along and may engage the step surface 170. As such, the step surface 170 may inhibit axial movement of the compression ring 32 in a direction that extends away from the steering knuckle body 40 and toward the hub cap 24. Moreover, an opposing side surface 196*b* may be spaced apart from the steering knuckle 20 and the hub 22. For instance, the opposing side surface 196*b* may be received in the opening 82 of the steering knuckle body 40 and may extend toward but may not engage the inner surface 58 of the steering knuckle body 40. As such, the opposing side surface 196*b* may not inhibit rotation of the hub 22 with respect to the steering knuckle 20, The opposing side surfaces 196 may include connecting surfaces 200 and end surfaces 202. The angled connecting surfaces 200 may extend at an oblique angle relative to the inner surface 192 and the outer surface 194. In at least one approach, the compression ring 32 includes a first connecting surface 200 that extends from a first end of the inner surface 192 toward the outer surface 194. The first connecting surface 200 may have a substantially planar cross section in the plane and extends at an oblique angle relative to the inner surface 192. The compression ring 32 may further include a second connecting surface 200 that extends from a second end of the inner surface 192 toward the outer surface 194. The second connecting surface 200 may have a substantially planar cross section in the plane and extends at an oblique angle relative to the inner surface.

The orthogonal end surfaces 202 may extend at a generally orthogonal angle relative to the inner surface 192 and the top surface 196. In at least one approach, the compression ring 32 may include a first end surface 202 that extends from an end of the first connecting surface 200 to the outer surface 194. The first end surface 202 may engage the hub 22. The compression ring 32 may further include a second end surface 202 that extends from an end of the second connecting surface 200 to the outer surface 194. The second end surface 202 may be disposed in the opening 82.

Figures 7, 8:
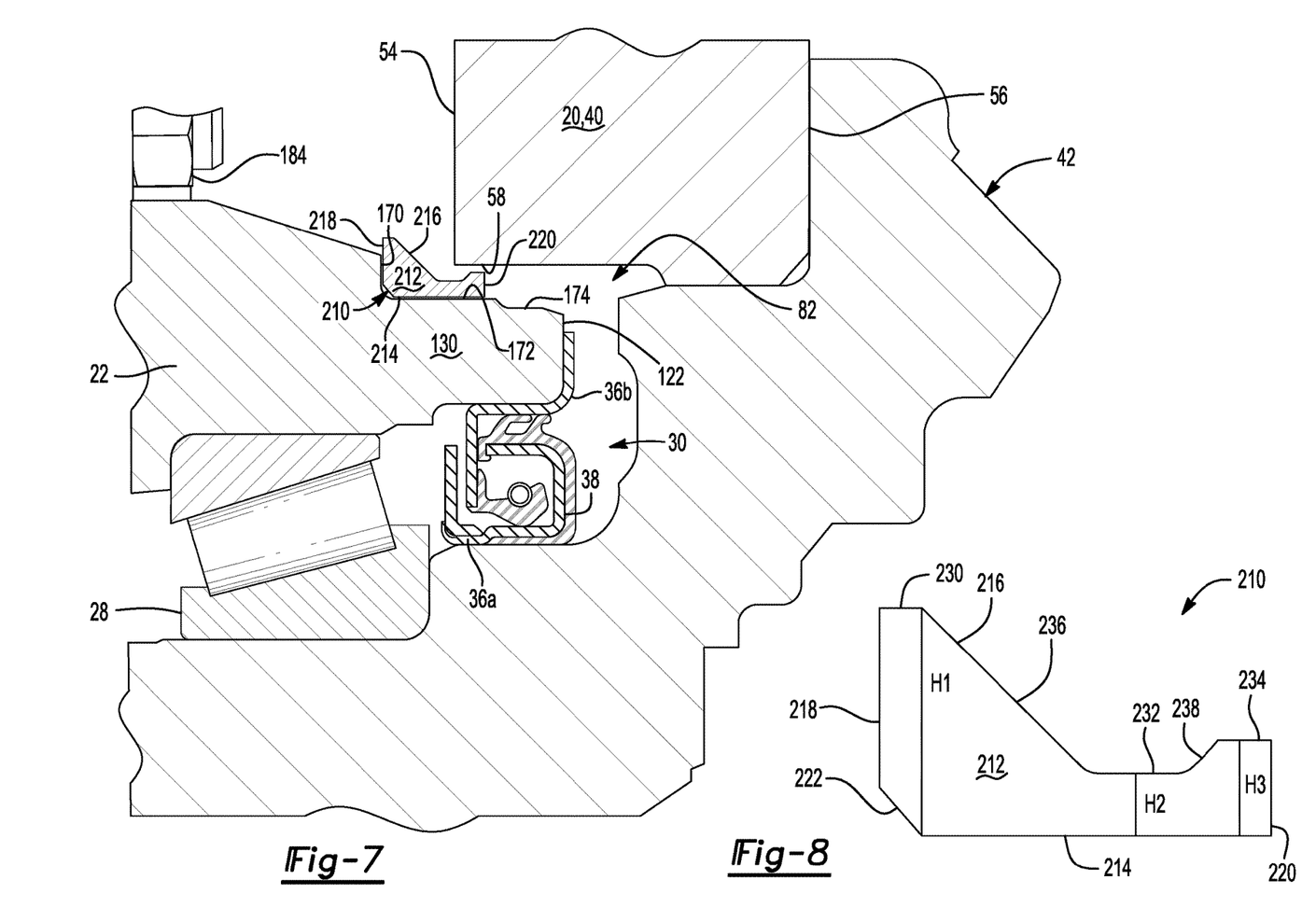
FIG. 7 is a magnified view of a portion of a wheel end assembly having another compression ring.
FIG. 8 is a section view of the compression ring of FIG. 7.

Referring to FIG. 7, another compression ring 210 is shown. The compression ring 210 may include a body 212 that may define (and may extend between) an inner surface 214, an outer surface 216, and opposing side surfaces 218, 220. Side surface 218, which may also be referred to as a first end surface, may extend a height greater than a height of the step surface 170. Side surface 220, which may also be referred to as a second end surface, may extend a height less than a height of the step surface 170.

The inner surface 214 may be disposed on the mounting ring 130 of the hub 22. In addition, inner surface 214 may extend continuously around the mounting ring 130 and the axis 80. The inner surface 214 may be disposed on the first outer surface 172 and may be radially disposed with respect to the axis 80. The inner surface 214 may be spaced apart from and may not engage the second outer surface 174.

Referring to FIG. 8, in at least one approach, a side wall (e.g., side wall 218) may form an inner connecting surface 222. The inner connecting surface 222 may be a feature such as a chamfer or fillet. The inner connecting surface 222 may extend approximately 45 degrees from the inner surface 214. The inner connecting surface 222 may space a portion of the body 212 from the step surface 170. In at least one approach, the inner connecting surface 222 is a planar surface. The inner connecting surface 222 may also, or instead, include a rounded surface having a curvature.

The body 212 may extend various lengths from the inner surface 214 along the cross-section of the compression ring 210. In this way, the outer surface 216 may define various top surfaces. For example, the body 212 may extend to a first perimeter surface 230 disposed a first height H1 from the inner surface 214, an intermediate outer surface 232 disposed a second height H2 from the inner surface 214, and a second perimeter surface 234 disposed a third height H3 from the inner surface 214. The first perimeter surface 230 may have an axial length along the cross-section of the compression ring 210 in the range of approximately 1 millimeter to approximately 2 millimeters. The second perimeter surface 234 may have an axial length along the cross-section of the compression ring 210 of approximately 2 millimeters.

One or more of the first perimeter surface 230, the intermediate outer surface 232, and the second perimeter surface 234 may extend parallel to the inner surface 214. In at least one approach, H1 may be greater than H2 and H3, and H3 may be greater than H2. The third height H3 may be, for example, half or less than half of the first height H1 (i.e., the first perimeter surface 230 may extend along a height that is twice as high, or more, from the inner surface 214 as the second perimeter surface 234). In at least one approach, H1 may be in the range of approximately 15 millimeters to approximately 16 millimeters. H2 may be approximately 2 millimeters. H3 may be in the range of approximately 5 millimeters to approximately 6 millimeters.

The outer surface 216 may further include a first outer connecting surface 236 and a second outer connecting surface 238. The first outer connecting surface 236 may extend, for example, between the first perimeter surface 230 and the intermediate outer surface 232. In this way, the first outer connecting surface 236 may have a variable height relative to the inner surface 214. The variable height may be in the range of H2 to H1. The second outer connecting surface 238 may extend, for example, between the intermediate outer surface 232 and the second perimeter surface 234. In this way, the second outer connecting surface 238 may also have a variable height relative to the inner surface 214. The variable height may be in the range of H2 to H3.

In at least one approach, the first outer connecting surface 236 is a planar surface. The first outer connecting surface 236 may also, or instead, include a rounded surface having a curvature. In at least one approach, the second outer connecting surface 238 is a planar surface. The second outer connecting surface 238 may also, or instead, include a rounded surface having a curvature.

In this way, the compression ring 210 may form a first peak at the first perimeter surface 230, a second peak at the second perimeter surface 234, and a valley at the intermediate outer surface 232. The first peak may block or inhibit contaminants from passing around the compression ring 210 to reach the seal assembly 30 or pass around the seal assembly 30 to contaminate the lubricant in the wheel end assembly 10, which may lead to wear and reduced component life. The contaminants may be collected in the valley.

Figure 9:
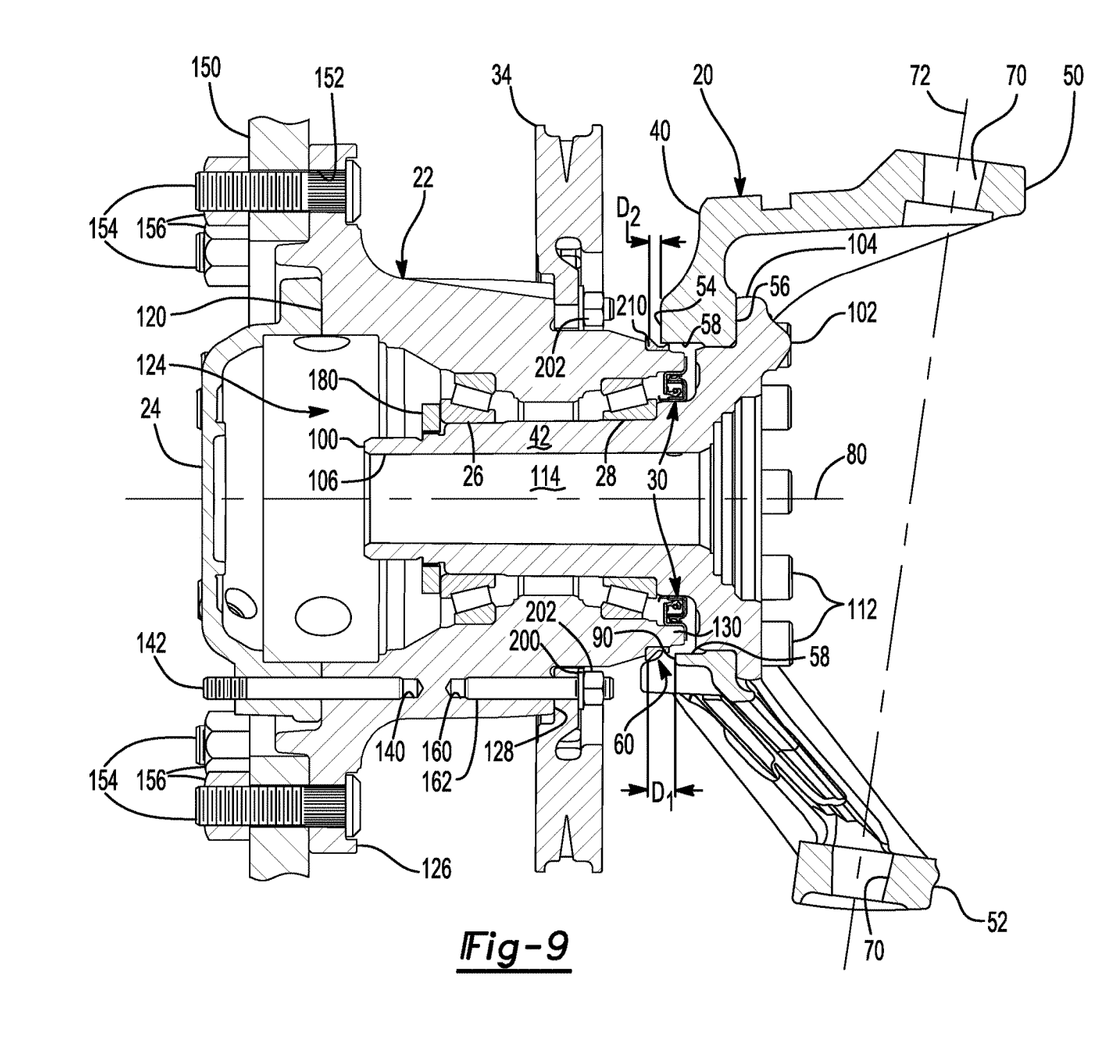
FIG. 9 is a section view of a wheel end assembly showing the compression ring of FIG. 7.

Referring to FIG. 9, axial positioning of the compression ring 210 with respect to the steering knuckle 20 is shown in more detail. In FIG. 9, the inner surface 58 of the steering knuckle body 40 extends in an axial direction further toward the hub 22 above the axis 80 than below the axis 80. More specifically, the inner surface 58 may have a shorter axial length where the notch 60 is provided in the steering knuckle body 40 than an axial length where the notch 60 is not provided in the steering knuckle body 40. As such, the axial distance $D_1$ from the step surface 170 of the hub 22 to the notch end surface 90 may be greater than the axial distance $D_2$ from the step surface 170 of the hub 22 to the outboard side 54. As such, the first perimeter surface 230 of the compression ring 210 may also be disposed further from the notch end surface 90 than from the outboard side 54. Such a configuration may allow contaminants that are received in or captured by the valley cross-section of the compression ring 210 to more freely exit the wheel end assembly 10 via the notch 60. As such, the compression ring 210 may be "self-cleaning" as contaminants that are captured by the compression ring 210 may be released or flung off the compression ring 210 as the hub 22 rotates and may exit the opening 82 via the notch 60.

In at least one approach, the compression rings 32, 210 may be formed of a first material, and the hub 22 may be formed of a second material different than the first material. For example, the hub 22 may be formed of aluminum, and the compression rings 32, 210 may be formed of steel. As such, the compression rings 32, 210 and the hub 22 may have different coefficients of thermal expansion. More particularly, the hub 22 may have a thermal expansion coefficient greater than that of the compression rings 32, 210. For example, the compression rings 32, 210 may have a volumetric thermal expansion coefficient ($\alpha_V$) in the range of approximately $33 \times 10^{-6} K^{-1}$ to approximately $39 \times 10^{-6} K^{-1}$ at 20° C. The hub 22 may have a volumetric thermal expansion coefficient ($\alpha_V$) in the range of approximately $68 \times 10^{-6} K^{-1}$ to approximately $70 \times 10^{-6} K^{-1}$ at 20° C.

As such, the compression rings 32, 210 may act to reduce or inhibit the degree of expansion of the hub 22 in the region of the mounting ring 130. For example, when the hub 22 is heated to a temperature (such as 150° C.) that would induce expansion of the mounting ring 130 but not the compression rings 32, 210, the radial compressive forces exerted by the compression rings 32, 210 on the mounting ring 130 may reduce or inhibit the degree of expansion of the mounting ring 130 away from the axis 80 with respect to the spindle 42 to maintain an interference fit between the outer seal case 36b and the mounting ring 130.

In at least one approach, one or more seals (not shown) may be disposed on the compression ring 32 or the compression ring 210. For example, a seal may be disposed on the outer surface 194 of compression ring 32 to at least partially fill the radial gap between the outer surface 194 and the inner surface 58 of the steering knuckle body 40. The seal may extend continuously around the axis 80. The seal may be made of any suitable material, such as a polymeric or an elastomeric material like rubber. In this way, the seal may help block or inhibit contaminants, such as particulates like dirt and pebbles and/or liquids, from passing through the opening 82 or passing between the compression ring 32 and the inner surface 58 of the steering knuckle body 40. A seal may similarly be disposed on the outer surface 216 (e.g., at the second perimeter surface 234) of the compression ring 210.

A method for assembling a wheel end assembly may include heating a compression ring, such as compression ring 32 or the compression ring 210, to expand the compression ring. The compression ring may be heated, for example, at a temperature of 200° C. The method may further include positioning the compression ring at an outer annular surface of a mounting ring of a hub. The method may further include positioning a seal assembly at an inner annular surface of the mounting ring. The compression ring may impart a radial compressive force on the mounting ring when the compression ring is cooled to a second temperature lower than the first temperature.

In at least one approach, the method may further include securing a steering knuckle to a spindle. The method may further include positioning the hub such that at least a portion of the compression ring is radially disposed between an annular surface of the spindle and an annular surface of the steering knuckle.

In at least one approach, a method for installing a compression ring is provided. The installation may be a retrofit installation. In this way, the method may include removing a hub from an axle spindle. The method may further include disposing the hub face such that a mounting ring is accessible (e.g., facing in an upward direction). In an optional approach, the method may include removing paint, dirt, or other substances from the mounting ring.

The method may include applying a continuous a bead of adhesive sealant (e.g., a 3 mm-wide bead) 360 degrees around the mounting ring.

The method may further include heating a hub compression ring, for example, in an oven. The compression ring may be heated to threshold temperature; for example, to approximately 204° C. Upon heating the compression ring to the threshold temperature, the method may further include removing the compression ring from the oven. The method may further include disposing the compression ring onto the mounting ring. The compression ring may be pressed down onto the mounting ring, for example, with hand force. In at least one approach, the compression ring is seated against the step surface of the hub (e.g., adjacent the mounting ring). The compression ring may impart a radial compressive force on the mounting ring when the compression ring cools to a temperature lower than the threshold temperature.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A wheel end assembly comprising:
a steering knuckle having a spindle and an opening that is a through hole that extends around the spindle, wherein the spindle at least partially fills the opening;
a hub that is rotatable about an axis with respect to the spindle;
a wheel bearing that rotatably supports the hub;
a seal assembly that is at least partially disposed in the opening and that extends from the spindle to the hub, the seal assembly having an outer seal case that is disposed on the hub and an inner seal case that is disposed on the spindle, wherein the seal assembly is spaced apart from the wheel bearing; and
a compression ring that is disposed on the hub and that is at least partially disposed in the opening, wherein the compression ring exerts a radial compressive force on the hub in a direction that extends toward the seal assembly and the axis to inhibit the outer seal case from moving with respect to the hub, wherein the compression ring further comprises a first end surface that engages the hub and a second end surface that is disposed opposite the first end surface, wherein the first end surface has a greater radial length than the second end surface.

2. The wheel end assembly of claim 1 wherein the compression ring has an inner surface that engages the hub and an outer surface that is disposed opposite the inner surface and that extends substantially parallel to the inner surface, wherein the outer surface extends from a first end of the compression ring that engages the hub to a second end of the compression ring that is disposed opposite the first end.

3. The wheel end assembly of claim 1 wherein the hub has a mounting ring upon which the seal assembly and the compression ring are disposed, wherein the compression ring inhibits expansion of the mounting ring away from the axis with respect to the spindle to maintain an interference fit between the outer seal case and the mounting ring.

4. The wheel end assembly of claim 3 wherein the compression ring and the outer seal case are disposed on opposite sides of the mounting ring.

5. The wheel end assembly of claim 1 wherein the hub has a volumetric thermal expansion coefficient greater than a volumetric thermal expansion coefficient of the compression ring.

6. The wheel end assembly of claim 1 wherein the steering knuckle has a steering knuckle body that includes an outboard side and an inboard side disposed opposite the outboard side, and the opening extends from the outboard side to the inboard side.

7. The wheel end assembly of claim 6 wherein the inboard side faces away from the hub, an inner surface of the steering knuckle extends from the outboard side to the inboard side and at least partially defines the opening, and the inboard side and the inner surface contact the spindle.

8. The wheel end assembly of claim 1 wherein the compression ring has an inner surface disposed in engagement with the hub, an outer surface that is disposed opposite the inner surface.

9. The wheel end assembly of claim 1 wherein the compression ring has an inner surface disposed in engagement with the hub and an outer surface that is disposed opposite the inner surface and that extends substantially parallel to the inner surface, wherein the outer surface extends from a first end of the compression ring that engages the hub to a second end of the compression ring that is disposed opposite the first end.

10. The wheel end assembly of claim 9 wherein the outer surface has a substantially planar cross section in a plane in which the axis is completely disposed.

11. The wheel end assembly of claim 10 wherein the compression ring includes a first connecting surface that extends from a first end of the inner surface of the compression ring toward the outer surface, wherein the first connecting surface has a substantially planar cross section in the plane and extends at an oblique angle relative to the inner surface of the compression ring.

12. The wheel end assembly of claim 11 wherein the first end surface extends from an end of the first connecting surface to the outer surface.

13. The wheel end assembly of claim 11 wherein the compression ring includes a second connecting surface that extends from a second end of the inner surface toward the outer surface, wherein the second connecting surface has a substantially planar cross section in the plane and extends at an oblique angle relative to the inner surface.

14. The wheel end assembly of claim 13 wherein the second end surface extends from an end of the second connecting surface to the outer surface, wherein the second end surface is disposed in the opening.

15. A wheel end assembly comprising:
a steering knuckle having a spindle and a steering knuckle body that includes an inner surface, wherein the inner surface at least partially defines an opening that extends around the spindle and that extends through the steering knuckle body, wherein the spindle at least partially fills the opening;
a hub that is rotatable about an axis with respect to the spindle;
a seal assembly that is at least partially disposed in the opening and that extends from the spindle to the hub, the seal assembly having an outer seal case that is disposed on the hub and an inner seal case that is disposed on the spindle; and
a compression ring that is disposed on the hub and that is at least partially disposed in the opening, wherein the compression ring exerts a radial compressive force on the hub in a direction that extends toward the seal assembly and the axis to inhibit the outer seal case from moving with respect to the hub, wherein the compression ring further comprises an inner surface disposed in engagement with the hub, an outer surface that is disposed opposite the inner surface of the compression ring, wherein at least a portion of the outer surface extends substantially parallel to the inner surface, an inner connecting surface that extends from a first end of the inner surface of the compression ring, and a first outer connecting surface that extends from an end of the outer surface toward the hub, wherein the inner connecting surface is disposed substantially parallel to the first outer connecting surface, a first end surface that extends from an end of the inner connecting surface and engages the hub, a first perimeter surface that extends from the first end surface to the first outer connecting surface, and a second end surface that extends from a second end of the inner surface of the compression ring, wherein the first end surface has a greater radial length than the second end surface.

16. The wheel end assembly of claim 15 wherein the hub has a mounting ring upon which the seal assembly and the compression ring are disposed, wherein the compression ring inhibits expansion of the mounting ring away from the axis with respect to the spindle to maintain an interference fit between the outer seal case and the mounting ring.

17. The wheel end assembly of claim 16 wherein the compression ring and the outer seal case are disposed on opposite sides of the mounting ring.

18. The wheel end assembly of claim 16 wherein the hub has a volumetric thermal expansion coefficient greater than a volumetric thermal expansion coefficient of the compression ring.

19. The wheel end assembly of claim 1 wherein the first perimeter surface is disposed substantially parallel to the inner surface of the compression ring.

20. The wheel end assembly of claim 1 wherein the compression ring further comprises a second perimeter surface that extends from the second end surface toward the hub and a second outer connecting surface that extends from second perimeter surface.

21. The wheel end assembly of claim 20 wherein the second end surface, second perimeter surface, and the second outer connecting surface are received in the opening.

22. The wheel end assembly of claim 1 wherein the first end surface extends radially outward past a portion of the hub that abuts the first end surface.

* * * * *